(12) United States Patent
Ekart et al.

(10) Patent No.: US 8,968,615 B2
(45) Date of Patent: Mar. 3, 2015

(54) LOW MELTING POLYESTER POLYMERS

(75) Inventors: Michael Paul Ekart, Kingsport, TN (US); Frederick Leslie Colhoun, Kingsport, TN (US); Mary Therese Jernigan, Kingsport, TN (US); Stephen Weinhold, Kingsport, TN (US); Rodney Scott Armentrout, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 810 days.

(21) Appl. No.: 12/909,126

(22) Filed: Oct. 21, 2010

(65) Prior Publication Data

US 2011/0040067 A1 Feb. 17, 2011

Related U.S. Application Data

(63) Continuation of application No. 11/018,119, filed on Dec. 21, 2004, now Pat. No. 7,935,399.

(60) Provisional application No. 60/606,733, filed on Sep. 2, 2004.

(51) Int. Cl.
  *B29C 47/38* (2006.01)
  *C08G 63/183* (2006.01)
  (Continued)

(52) U.S. Cl.
  CPC .......... *C08G 63/183* (2013.01); *B29C 49/0005* (2013.01); *B29C 51/002* (2013.01);
  (Continued)

(58) Field of Classification Search
  USPC ............. 264/171.23, 171.28, 172.18, 173.14, 264/173.19, 464, 510, 512, 514, 173.12, 264/173.16, 176.1, 241
  See application file for complete search history.

(56) References Cited

U.S. PATENT DOCUMENTS 3,451,971 A 6/1969 Lazarus
3,624,040 A 11/1971 Rath et al.
(Continued)

FOREIGN PATENT DOCUMENTS

DE 1950553 4/1970
EP 0492999 9/1992
(Continued)

OTHER PUBLICATIONS

Office Action dated Sep. 21, 2005 from co-pending U.S. Appl. No. 10/795,783.
(Continued)

*Primary Examiner* — Jeffrey Wollschlager
*Assistant Examiner* — Stella Yi
(74) *Attorney, Agent, or Firm* — Betty J. Boshears (57) ABSTRACT

A bulk of polyester polymer particles comprising polyester polymer comprising greater than 75% virgin polyester polymer, the particles having:
A) an It.V. of at least 0.72 dl/g, and
B) 10 ppm or less of residual acetaldehyde; and
C) at least two melting peaks, wherein one of said at least two melting peaks is a low peak melting point within a range of 140° C. to 220° C. and having a melting endotherm area of at least the absolute value of 1 J/g.

The particles may also have a degree of crystallinity within a range of 20% and a maximum degree of crystallinity $T_{cmax}$ defined by the equation:

$$T_{cmax} = 50\% - CA - OH$$

where CA is the total mole % of all carboxylic acid residues other than terephthalic acid residues, based on 100 mole % of carboxylic acid residues, and OH is the total mole % of all hydroxyl functional compound residues other than ethylene glycol residues, based on 100 mole % of hydroxyl functional compounds residues. The preforms and bottles made from these particles can be obtained by melt processing these particles at either lower overall power, faster screw speeds, lower residence time, or lower overall cycle time to thereby reduce the level of residual acetaldehyde generated in the melt.

13 Claims, 1 Drawing Sheet

(51) Int. Cl.
  *B29C 49/00* (2006.01)
  *B29C 51/00* (2006.01)
  *C08G 63/90* (2006.01)
  *B29C 49/06* (2006.01)
  *B29K 67/00* (2006.01)

(52) U.S. Cl.
  CPC ........ *C08G 63/90* (2013.01); *B29B 2911/1402* (2013.01); *B29B 2911/14026* (2013.01); *B29B 2911/14033* (2013.01); *B29B 2911/1404* (2013.01); *B29B 2911/14106* (2013.01); *B29B 2911/14133* (2013.01); *B29C 49/06* (2013.01); *B29K 2067/00* (2013.01)
  USPC ................ 264/211.21; 264/211.23; 264/464; 264/173.12; 264/241; 264/211.15; 264/211.18; 264/171.21; 264/171.23; 264/171.28; 264/172.18; 264/173.14; 264/173.19

(56) References Cited

U.S. PATENT DOCUMENTS

| | | | |
|---|---|---|---|
| 3,631,153 A | 12/1971 | Carter et al. | |
| 3,953,404 A | 4/1976 | Borman | |
| 3,960,807 A | 6/1976 | McTaggart | |
| 4,100,142 A | 7/1978 | Schaefer et al. | |
| 4,260,735 A | 4/1981 | Bander et al. | |
| 4,267,310 A | 5/1981 | Landoll | |
| 4,289,871 A | 9/1981 | Rowan et al. | |
| 4,501,878 A | 2/1985 | Adams | |
| 4,613,664 A | 9/1986 | Tate et al. | |
| 4,619,987 A | 10/1986 | Saiki et al. | |
| 4,647,650 A | 3/1987 | Sasaki et al. | |
| 5,409,750 A | 4/1995 | Hamada et al. | |
| 5,442,036 A | 8/1995 | Beavers et al. | |
| 5,444,144 A | 8/1995 | Tanaka et al. | |
| 5,474,111 A | 12/1995 | Williamson et al. | |
| 5,540,868 A | 7/1996 | Stouffer et al. | |
| 5,573,820 A | 11/1996 | Harazoe et al. | |
| 5,648,032 A | 7/1997 | Nelson et al. | |
| 5,714,262 A | 2/1998 | Stouffer et al. | |
| 5,744,074 A | 4/1998 | Stouffer et al. | |
| 5,886,133 A | 3/1999 | Hilbert et al. | |
| 5,898,058 A | 4/1999 | Nichols et al. | |
| 5,902,539 A | 5/1999 | Schmidt et al. | |
| 5,980,797 A | 11/1999 | Shelby et al. | |
| 6,048,957 A | 4/2000 | Ekart et al. | |
| 6,066,713 A | 5/2000 | Mrose et al. | |
| 6,090,898 A | 7/2000 | Tsunekawa et al. | |
| 6,099,778 A | 8/2000 | Nelson et al. | |
| 6,194,536 B1 | 2/2001 | Schmidt et al. | |
| 6,200,659 B1 | 3/2001 | Fujimori et al. | |
| 6,235,228 B1 | 5/2001 | Nicholl et al. | |
| 6,316,584 B1 | 11/2001 | Seidel et al. | |
| 6,320,014 B1 | 11/2001 | Takahashi et al. | |
| 6,335,422 B2 | 1/2002 | Schiavone | |
| 6,339,109 B1 | 1/2002 | Day et al. | |
| 6,344,539 B1 | 2/2002 | Palmer | |
| 6,384,180 B1 | 5/2002 | Jernigan et al. | |
| 6,395,865 B2 | 5/2002 | Schmidt et al. | |
| 6,472,500 B2 | 10/2002 | Dhawan et al. | |
| 6,500,915 B1 | 12/2002 | Fujimori et al. | |
| 6,517,762 B1 | 2/2003 | Tsunekawa et al. | |
| 6,559,271 B2 | 5/2003 | Schaaf et al. | |
| 6,586,558 B2 | 7/2003 | Schmidt et al. | |
| 6,613,259 B2 | 9/2003 | Takahashi et al. | |
| 6,616,968 B2 | 9/2003 | Bostrom et al. | |
| 6,669,986 B1 | 12/2003 | Mushiake et al. | |
| 6,703,474 B2 | 3/2004 | Fujimori et al. | |
| 6,710,158 B2 | 3/2004 | Edwards et al. | |
| 6,903,154 B2 | 6/2005 | Stafford et al. | |
| 2001/0034431 A1 | 10/2001 | Schiavone | |
| 2002/0102419 A1* | 8/2002 | Kawahara et al. | 428/458 |
| 2002/0128427 A1 | 9/2002 | Schaaf et al. | |
| 2003/0144459 A1 | 7/2003 | Fujimori et al. | |
| 2005/0065318 A1 | 3/2005 | Jernigan et al. | |
| 2005/0085620 A1 | 4/2005 | Bruckmann | |
| 2005/0110184 A1* | 5/2005 | Eloo | 264/143 |
| 2005/0154183 A1 | 7/2005 | Ekart et al. | |
| 2005/0196566 A1 | 9/2005 | Colhoun et al. | |
| 2005/0215753 A1 | 9/2005 | Otto et al. | |
| 2006/0046004 A1 | 3/2006 | Ekart et al. | |
| 2006/0149026 A1 | 7/2006 | Jernigan et al. | |
| 2007/0135614 A1 | 6/2007 | Ekart et al. | |

FOREIGN PATENT DOCUMENTS

| | | |
|---|---|---|
| EP | 0661326 A2 | 7/1995 |
| EP | 0699700 | 3/1996 |
| EP | 0774477 | 5/1997 |
| GB | 1337751 | 11/1973 |
| JP | 46-41025 | 12/1971 |
| JP | 46041033 | 12/1971 |
| JP | 47039497 | 11/1972 |
| JP | 47042989 | 12/1972 |
| JP | 48005798 | 1/1973 |
| JP | 48007272 | 3/1973 |
| JP | 48026955 | 4/1973 |
| JP | 48031991 | 10/1973 |
| JP | 48079898 | 10/1973 |
| JP | 48038634 | 11/1973 |
| JP | 48038635 | 11/1973 |
| JP | 48038637 | 11/1973 |
| JP | 49005918 | 1/1974 |
| JP | 49010834 | 1/1974 |
| JP | 49006835 | 2/1974 |
| JP | 49006839 | 2/1974 |
| JP | 49009116 | 3/1974 |
| JP | 48045015 | 4/1974 |
| JP | 49045014 | 4/1974 |
| JP | 50039711 | 4/1975 |
| JP | 51042795 | 4/1976 |
| JP | 51127195 | 11/1976 |
| JP | 52123489 | 10/1977 |
| JP | 52129798 | 10/1977 |
| JP | 52129799 | 10/1977 |
| JP | 53051294 | 5/1978 |
| JP | 53051295 | 5/1978 |
| JP | 53052595 | 5/1978 |
| JP | 53105591 | 9/1978 |
| JP | 54135896 | 10/1979 |
| JP | 54163996 | 12/1979 |
| JP | 55089332 | 7/1980 |
| JP | 55149320 | 11/1980 |
| JP | 56008431 | 1/1981 |
| JP | 57038609 | 8/1982 |
| JP | 58109532 | 6/1983 |
| JP | 60-219226 | 11/1985 |
| JP | 62-297318 | 12/1987 |
| JP | 3-146707 | 6/1991 |
| JP | 3-161509 | 7/1991 |
| JP | 05-070567 | 3/1993 |
| JP | 1993070567 | 3/1993 |
| JP | EP0661326 | * 12/1994 |
| JP | 7001447 | 1/1995 |
| JP | 1996003301 | 1/1996 |
| JP | 1996283398 | 10/1996 |
| JP | 8-325364 | 12/1996 |
| JP | 1999152324 | 6/1999 |
| JP | 2000128970 | 5/2000 |
| JP | 2000128971 | 5/2000 |
| JP | 2000204145 | 7/2000 |
| JP | 2002322258 | 11/2002 |
| KR | 1997-0007952 | 5/1997 |
| KR | 2001-0089942 | 10/2001 |
| NL | 7113206 | 3/1972 |
| WO | WO 92/02569 | 2/1992 |
| WO | WO 01/14452 | 3/2001 |

OTHER PUBLICATIONS

Office Action dated Jul. 12, 2006 from co-pending U.S. Appl. No. 10/795,783.

(56) References Cited

OTHER PUBLICATIONS

Office Action dated May 18, 2007 from co-pending U.S. Appl. No. 10/795,783.
Office Action dated Jan. 10, 2006 from co-pending U.S. Appl. No. 11/018,357.
Office Action dated Sep. 22, 2006 from co-pending U.S. Appl. No. 11/018,357.
Office Action dated Feb. 2, 2007 from co-pending U.S. Appl. No. 11/018,357.
Office Action dated Aug. 2, 2007 from co-pending U.S. Appl. No. 11/454,271.
Syang-Peng Rwei, Properties of Poly(Ethylene Terephthalate)/Poly(Ethylene Naphthalate) Blends, Polymer Engineering and Science, Dec. 1999, vol. 39, No. 12, pp. 2475-2481.
Stefanos L. Sakellarides, The Effect of Isophthalic Acid Modification on the Thermal Crystallization of PET, Antec 1996, pp. 938-942.
Yoshitsugu Maruhashi, Primary Structure and Physical Properties of Poly(ethylene terephthalate)/Poly(ethylene naphthalate) Resin Blends, Polymer Engineering and Science, Jan. 2003, vol. 43, No. 1.
N. Torres, J.J. Rob, B. Boutevin, Study of thermal and mechanical properties of virgin and recycled poly(ethylene terephthalate) before and after injection molding, European Polymer Journal, 1999, pp. 2075-2080.
Darwin PR Kint, Antxon Martinex De Ilarduy, Abdelilah Alla, Sabastian Munoz-Guerra, Poly(ethylene terephthalate) Terpolyesters Containing Isophthalic and 5-tert-Buylisophthalic Units, 2002, pp. 124-134.
Darwin PR Kint, Antxon Martinez De Ilarduya, Sebastian Munoz-Guerra, Poly(ethylene terephthalate) Copolymers Containing 5-tert-Butyl Isophthalic Units, 2001, pp. 1994-2004.
Darwin PR Kint, Abdelilah Alla, Elise Deloret, Josefina L. Campos, Sebastian Munoz-Guerra, Synthesis, characterization and properties of poly(ethylene terephthalate)/poly(1,4-butylene succinate) block copolymers, 2002, pp. 1321-1330.
Darwin PR Kint, Antxou Martinez De Ilarduya, Antoni Sansalvado, Josep Ferrer, Jose I. Iribarren, Sebastian Munoz-Guerra, Structural Characterization and Thermal Properties of Poly(ethylene terephthalate) Copolymers Containing 2-Butyl-2-ethyl-1,3-propanediol, Journal of Applied Polymer Science, vol. 86 1077-1086, 2002, Wiley Periodicals, Inc.
Yongjian Liu, Crystallization and Melting Behavior of Liquid Crystalline Co-polyesters Based on Modified Poly-[(p-hydroxybenzoic acid)-co-(ethylene terephthalate)], Macromolecular Chemistry and Physics, 2001, 202 No. 4; Wiley-VCH; pp. 488-494.
Jinshu Yu, Der Zhou, and Veimin Chai, Synthesis and Non-Isothermal Crystallization Behavior of Poly(ethylene-co-1,4-butylene terephthalate)s, Macromolecular Research, vol. 11, No. 1 pp. 25-25, 2003.
Eun Jae Hyun, So Hwa Lee, Yeong Soon Gal, Sang Hee Jang, Hyun Kuk Choi, Boo Young Shin, Gil Soo Sur, and Bong Shik Kim, A Study on Fabrication of Polyester Copolymers (IV)—Physical Properties of PET/BPA Copolymer-, Polymer (Korea), vol. 25, No. 2, pp. 208-217, 2001, Korean Article Available Only.
Co-pending U.S. Appl. No. 11/018,357, filed Dec. 21, 2004.
Co-pending U.S. Appl. No. 11/454,271, filed Jun. 16, 2006.
Co-pending U.S. Appl. No. 10/795,783, filed Mar. 8, 2004.
Moore, Eugene R. et al., "Polyethylene Terephthalate," Supplement B, SRI Consulting, Dec. 2000, pp. 5-30 and 5-31.
Kirk-Othmer Encyclopedia of Chemical Technology, Fifth Edition, vol. 20, John Wiley & Sons, Inc., 2006, p. 49.
Ullmann's Encyclopedia of Industrial Chemistry, Sixth, vol. 28, "Polyacrylates to Polyurethanes," 2003 Willey-VCH Verlag GnbH & Co. KGaA, Weinheim, p. 85.
Fourne, F., "Synthetic Fibers, Machines and Equipment, Manufacture, Properties," Handbook for Plant Engineering, Machine Design, and Operation, Hanser Publishers, Munich, 1999, 4.3.3, pp. 244-246.
Encyclopedia of Polymer Science and Technology, vol. 7, "Metal-Containing Polymers to Rigid-Rod Polymers," John Wiley & Sons, Inc. 2003, pp. 508-509.
Kirk-Othmer Encyclopedia of Chemical Technology, Fourth Edition, vol. 19, "Pigments to Powders, Handling," John Wiley & Sons, Inc. 1996, pp. 620-621.
USPTO Notice of Allowance dated Sep. 5, 2008 for copending U.S. Appl. No. 10/795,783.
USPTO Office Action dated Sep. 26, 2007 for copending U.S. Appl. 11/018,357.
USPTO Office Action dated Nov. 23, 2007 for copending U.S. Appl. 11/018,357.
USPTO Office Action dated Jun. 19, 2008 for copending U.S. Appl. No. 11/018,357.
USPTO Office Action dated Jan. 7, 2009 for copending U.S. Appl. No. 11/454,271.
USPTO Office Action dated Mar. 17, 2008 for copending U.S. Appl. 11/454,271.

* cited by examiner

LOW MELTING POLYESTER POLYMERS

CROSS REFERENCE TO RELATED APPLICATIONS

This application is a continuation of U.S. Non-Provisional Application Ser. No. 11/018,119, filed Dec. 21, 2004, which claims the benefit of U.S. Provisional Application No. 60/606,733, filed Sep. 2, 2004, the entirety of which is hereby incorporated by reference.

1. FIELD OF THE INVENTION

The invention pertains to polyester polymers, and more particularly to polyester polymers having physical properties requiring less energy to extrude and suitable for packaging and container applications.

2. BACKGROUND OF THE INVENTION

When polyester polymer particles are molded into articles, they are first dried to remove moisture that otherwise would cause chain scission and excessive loss of intrinsic viscosity (It.V.) during the molding process. The drying time can be shortened by increasing the drying temperature. To increase the drying temperature, the polyester particles must first be crystallized to prevent the pellets from sticking at their glass transition temperature (about 80° C.). By first crystallizing the polyester particles, drying temperatures of up to about 190° C. can be achieved, above which the heated air begins to cause the polymer to yellow.

Pellets are typically crystallized at about 140-180° C. for about 40 min. to 1 hour, then preheated to about 180-215° C. for 1-4 hours, and then solid state polymerized at about 200-220° C. for about 8 to 12 hours to increase their molecular weight in the solid state. The high temperatures and long times in the crystallization and solid stating processes combined typically impart to the pellets a degree of crystallinity in excess of 50% and melting points above about 220° C. Such high crystallinity and high melting point in the polymer is a disadvantage in the extrusion zone for a molding process since more energy is required to melt the polymer particles as the degree of crystallinity and/or the melting point increases. This amount of energy applied to the crystallized pellets will depend on the nature of the polymer since each polymer has a different latent heat of fusion, and the degree of crystallinity in any given pellet. For a given polymer composition, increasing the degree of crystallinity increases the mass of the crystalline regions, thereby increasing the energy required to melt the particles. Accordingly, it would be desirable to melt extrude particles with a lower degree of crystallinity to save energy costs. The energy cost savings can manifest itself in a number of different ways, including reduced total power consumption to the screw motor and heating elements. Alternatively, the same amount of energy can be applied to more efficiently process the pellets by reducing the time to melt, thereby reducing cycle time and/or the generation of acetaldehyde.

With the use of polyester polymer particles having high levels of crystallinity and/or high melting points, a higher temperature is frequently required to process the polymer resulting in an increase in the production rate of acetaldehyde, thereby increasing the overall amount of acetaldehyde present in the melt or articles formed from the melt. Therefore, the polyester polymer particles fed to the extruder or injection molding machine should also have a low level of residual acetaldehyde to help reduce the overall level of acetaldehyde in the melt and the articles formed from the molten polymer.

Prior to solid-state polymerizing polyester particles, pellets are also prepared in crystallizers at high temperatures in order to mitigate agglomeration in solid stating zones which operate at high temperatures needed to advance the molecular weight of the particles. This crystallization process combined with the annealing or perfecting of the crystals during the long hot solid-stating process imparts to the pellets high melting points of about 220° C. and more. Also, with high melting points, the temperature applied to the pellets in the dryer can be increased. However, the high melt points have the disadvantage of also requiring a slight increase of the temperature of the polymer melt in the extruder by a few degrees, thereby increasing the cooling time of molded products, increasing cycle time, and increasing the potential for more acetaldehyde formation. Moreover, in the solid stating process, the high temperatures applied to the polymer can anneal the polymer, with the effect that at times, some particles do not completely melt in the extrusion zone and thereby cause deformities in the molded product.

3. SUMMARY OF THE INVENTION

The polyester polymer particles of the invention have sufficient crystallinity for drying, have sufficient melting point to continue drying at the conventional temperatures, but not the higher crystallinity and melting points that are associated with solid-stating polymerization processes prevalent in the polyester industry. These advantages and others are obtained by providing a bulk of polymer particles comprising polyethylene terephthalate polymers and copolymers modified with 20% or less modifiers, the particles comprising greater than 75% virgin polyester polymer, and the particles having:

A) an It.V. of at least 0.72 dL/g, and
B) 10 ppm or less of residual acetaldehyde; and
C) at least two melting peaks (on a DSC first heating scan), wherein one of said at least two melting peaks is a low peak melting point having a peak temperature within a range of 130° C. to 220° C. and having a melting endotherm area of at least the absolute value of 1 J/g, or having one or more melting points which, when measured on a DSC first heating scan, has a heating curve departing from a baseline in the endothermic direction at a temperature of less than or equal to 200° C., or less than or equal to 190° C., or less than or equal to 180° C.

The particles preferably have a low degree of crystallinity within a range of at least 20% and a maximum degree of crystallinity $T_{cmax}$ defined by the equation:

$$T_{cmax} = 50\% - CA - OH$$

where CA is the total mole % of all carboxylic acid residues other than terephthalic acid residues, based on 100 mole % of carboxylic acid residues in the polyester polymer, and OH is the total mole % of hydroxyl functional compound residues other than ethylene glycol residues, based on 100 mole % of the hydroxyl functional compounds residues.

There is also provided a method of extruding polyester polymer particles comprising:

A) drying polyester polymer particles in a drying zone to produce dried particles;
B) introducing the dried particles into an melting zone;
C) melting the polyester polymer particles in the melt processing zone, and
D) forming an article from the molten polymer;

wherein the polyester polymer particles introduced into the drying zone comprise at least 75% virgin polyester and have an It.V. of at least 0.72 dl/g, a residual acetaldehyde content of 10 ppm or less, and have at least two melting peaks, wherein one of said at least two melting peaks is a low peak melting point having a peak temperature within a range of 140° C. to 220° C. and having a melting endotherm area of at least the absolute value of 1 J/g.

The particles in this embodiment also preferably are within the range of crystallinity mentioned above.

In yet another embodiment, there is provided a process for melt processing polyester polymer particles comprising:
  A) if a drying zone is present, drying the particles in the drying zone to produce dried particles;
  B) feeding the particles into a melt processing zone, or if a drying zone is present, feeding dried particles into a melt processing zone;
  C) melting the particles in the melting processing zone, and
  D) forming articles from the melt;
wherein the polymer particles introduced into the melt processing zone or into the drying zone if present comprise polyethylene terephthalate polymers and copolymers modified with 20 mole % or less of modifiers based on 100 mole % of the carboxylic acid residues and 100 mole % of the hydroxyl functional compound residues, and the particles comprise at least 75% virgin polyester, have an It.V. of at least 0.72 dl/g, have a residual acetaldehyde content of 10 ppm or less, and have at least two melting peaks in which one of said at least two melting peaks is a low peak melting point with a peak temperature within a range of 140° C. to 220° C. and having a melting endotherm area of at least the absolute value of 1 J/g; and the melt processing zone comprises a barrel, a die or orifice, and a heating element directing heat to the barrel; and the temperature setting of a heating element directing heat to a last zone on the barrel closest to the die or orifice is established, said temperature setting being lower in said last zone on the barrel than would be applied to melt process the same polyester polymer particles having a low peak melting point (or a sole peak melting point where two peaks do not exist) greater than 220° C., to form the same article having substantially the same level of haze and applying all of the same settings in the melt processing zone other than the temperature setting.

In another embodiment of the invention, there is provided a process for melt processing polyester polymer particles comprising:
  A) if a drying zone is present, drying the particles in the drying zone to produce dried particles;
  B) feeding the particles into a melt processing zone, or if a drying zone is present, feeding dried particles into a melt processing zone;
  C) melting the particles in the melting processing zone, and
  D) forming articles from the melt;
wherein the polymer particles introduced into the melt processing zone or into the drying zone if present comprise polyethylene terephthalate polymers and copolymers modified with 20 mole % or less of modifiers based on 100 mole % of the carboxylic acid residues and 100 mole % of the hydroxyl functional compound residues, and the particles comprise at least 75% virgin polyester, have an It.V. of at least 0.72 dl/g, have a residual acetaldehyde content of 10 ppm or less, and have at least two melting peaks in which one of said at least two melting peaks is a low peak melting point with a peak temperature within a range of 140° C. to 220° C. and having a melting endotherm area of at least the absolute value of 1 J/g; and the melt processing zone comprises a barrel, a heating element directing heat to the barrel, a screw rotating within the barrel, and a screw motor; and a melt residence time within the barrel is applied which is shorter than the melt residence time that would be applied to melt process, at all of the same other settings to the melt processing zone, a polyester polymer having the same It.V, same composition, a low peak melting point (or a sole peak melting point where two peaks do not exist) greater than 220° C., to form the same article having substantially the same level of haze.

There is further provided a process for melt processing polyester polymer particles comprising:
  A) if present, drying particles in a drying zone to produce dried particles;
  B) feeding the particles into a melt processing zone, or if a dryer is present, feeding dried particles into a melt processing zone;
  C) melting the particles in the melting processing zone, and
  D) forming articles from the melt;
wherein the polymer particles introduced into the melt processing zone or into the drying zone if present comprise polyethylene terephthalate polymers and copolymers modified with 20 mole % or less of modifiers based on 100 mole % of the carboxylic acid residues and 100 mole % of the hydroxyl functional compound residues, and the particles comprise at least 75% virgin polyester polymer, have an It.V. of at least 0.72 dl/g, and have a degree of crystallinity within a range of 20% and a maximum degree of crystallinity $T_{cmax}$ defined by the equation:

$$T_{cmax}=50\%-CA-OH$$

where CA is the total mole % of all carboxylic acid residues other than terephthalic acid residues, based on 100 mole % of carboxylic acid residues, and OH is the total mole % of all hydroxyl functional compound residues other than ethylene glycol residues, based on 100 mole % of hydroxyl functional compounds residues; and wherein the melt processing zone comprises a barrel, a heating element directing heat to the barrel, a screw within the barrel, and a screw motor, and wherein a total power is applied to the motor and to the heating element which is less than the total power that would be applied to the motor and to the heating element at the same settings to melt process a polyester polymer having the same It.V, same composition, a degree of crystallization greater than $T_{cmax}$, and at an equivalent melt residence time within the melt processing zone to form the same article having substantially the same level of haze.

In yet another embodiment, there is provided a process for melt processing polyester polymer particles comprising:
  A) if a drying zone is present, drying the particles in the drying zone to produce dried particles;
  B) feeding the particles into a melt processing zone, or if a drying zone is present, feeding dried particles into a melt processing zone;
  C) melting the particles in the melting processing zone, and
  D) forming articles from the melt;
wherein the polymer particles introduced into the melt processing zone or into the drying zone if present comprise polyethylene terephthalate polymers and copolymers modified with 20 mole % or less of modifiers based on 100 mole % of the carboxylic acid residues and 100 mole % of the hydroxyl functional compound residues, and the particles comprise at least 75% virgin polyester, have an It.V. of at least 0.72 dl/g, have a residual acetaldehyde content of 10 ppm or less, and have at least two melting peaks in which one of said at least two melting peaks is a low peak melting point within a range of 140° C. to 220° C. and having a melting endotherm area of at least 1 J/g; and the melt processing zone comprises a barrel, a heating element directing heat to the barrel, a screw rotating within the barrel, and a screw motor; and the screw revolutions are at a setting which is higher than the screw revolutions that would be applied to melt process, at the same power, a polyester polymer having the same It.V, same composition, a low peak melting point (or a sole peak melting point where two peaks do not exist) greater than 220° C., to form the same article having substantially the same level of haze.

In another embodiment of this invention, there is a bulk of polymer particles comprising polyethylene terephthalate polymers and copolymers modified with 20 mole % or less of modifiers based on 100 mole % of carboxylic acid residues and 100 mole % of hydroxyl functional compound residues, the particles comprising greater than 75% virgin polyester polymer, and the particles having:

A) an It.V. of at least 0.72 dl/g, and
B) 10 ppm or less of residual acetaldehyde; and
C) a low temperature shoulder on a DSC first heating scan such that a heating curve departs from the baseline in the endothermic direction at a temperature less than or equal to 200° C., or less than or equal to 190° C., or less than or equal to 180° C.

There is also provided the bottle preforms and stretch blow molded bottles made from the particles mentioned above or made by any one of the process embodiments mentioned above.

5. DETAILED DESCRIPTION OF THE INVENTION

The present invention may be understood more readily by reference to the following detailed description of the invention. It is to be understood that this invention is not limited to the specific processes and conditions described, as specific processes and/or process conditions for processing plastic articles as such may, of course, vary.

It must also be noted that, as used in the specification and the appended claims, the singular forms "a", "an" and "the" include plural referents. For example, reference to processing a thermoplastic "preform", "article", "container", or "bottle" is intended to include the processing of a plurality of thermoplastic preforms, articles, containers or bottles. Reference to processing a polymer at a stated temperature or with a heating element includes other temperatures and additional heating elements, if desired, in addition to the one stated at different times throughout the processing history unless otherwise stated. References to a composition containing "an" ingredient or "a" polymer is intended to include other ingredients or other polymers, respectively, in addition to the one named.

Ranges may be expressed herein as "within" or "between" or from one value to another. In each case, the end points are included in the range. Ranges expressed as being greater than or less than a value exclude the end point(s).

By "comprising" or "containing" or "having" is meant that at least the named compound, element, particle, or method step etc must be present in the composition or article or method, but does not exclude the presence of other compounds, materials, particles, method steps, etc, even if the other such compounds, material, particles, method steps etc. have the same function as what is named.

Regardless of the context, the expression of a temperature means the temperature applied to the polymer unless otherwise expressed as the "actual" polymer or melt temperature.

It is also to be understood that the mention of one or more method steps does not preclude the presence of additional method steps or intervening method steps between those steps expressly identified.

The intrinsic viscosity values described throughout this description are set forth in dL/g units as calculated from the inherent viscosity measured at 25° C. in 60/40 wt/wt phenol/tetrachloroethane. The inherent viscosity is calculated from the measured solution viscosity. The following equations describe such solution viscosity measurements and subsequent calculations to Ih.V. and from Ih.V. to It.V:

$$\eta_{inh}=[\ln(t_s/t_o)]/C$$

where
$\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0}\ln(\eta_r/C)$$

where
$\eta_{int}$=Intrinsic viscosity
$\eta_r$=Relative viscosity=$t_s/t_o$
$\eta_{sp}$=Specific viscosity=$\eta_r-1$ Instrument calibration involves replicate testing of a standard reference material and then applying appropriate mathematical equations to produce the "accepted" Ih.V. values.

Calibration Factor=Accepted Ih.V. of Reference Material/Average of Replicate Determinations Corrected Ih.V.=Calculated Ih.V.×Calibration Factor The intrinsic viscosity (It.V. or $\eta_{int}$) may be estimated using the Billmeyer equation as follows:

$$\eta_{int}=0.5[e^{0.5 \times Corrected\ Ih.V.}-1]+(0.75\times Corrected\ Ih.V.)$$

In one embodiment, there is provided bulk of polyester polymer particles comprising greater than 75% virgin polyester polymer, the particles having:

A) an It.V. of at least 0.72 dl/g, and
B) 10 ppm or less of residual acetaldehyde; and
C) at least two melting peaks, wherein one of said at least two melting peaks is a low peak melting point within a range of 140° C. to 220° C. and having a melting endotherm area of at least the absolute value of 1 J/g, or having one or more melting points which, when measured on a DSC first heating scan, has a heating curve departing from a baseline in the endothermic direction at a temperature of less than or equal to 200° C., or less than or equal to 190° C., or less than or equal to 180° C.

The particles preferably have a low degree of crystallinity within a range of at least 20% and a maximum degree of crystallinity $T_{cmax}$ defined by the equation:

$$T_{cmax}=50\%-CA-OH$$

where CA is the total mole % of all carboxylic acid residues other than terephthalic acid residues, based on 100 mole % of the carboxylic acid residues in the polyester polymers, and OH is the total mole % of all hydroxyl functional compound residues other than ethylene glycol residues, based on 100 mole % of the hydroxyl functional compounds residues in the polyester polymers.

The polyester polymer composition is in its isolated form since a degree of crystallinity is imparted, as opposed to polyester compositions in a melt phase process or as a melt in the extruder since as a melt, crystallinity disappears.

The shape of the polyester polymer particles is not limited, and can include regular or irregular shaped discrete particles without limitation on their dimensions, including flake, stars, spheres, conventional pellets, needles, pastilles, and any other shape, but particles are distinguished from a sheet, film, preforms, strands or fibers.

The particles desirably have a number average weight of at least 0.10 g per 100 particles, more preferably greater than 1.0 g per 100 particles, and up to about 100 g per 100 particles. The volume of the particles is not particularly limited, but in one embodiment, there is provided a bulk of particles occupying a volume of at least 1 cubic meter, or at least 3 cubic meters, or at least 5 cubic meters.

The "bulk" of polyester polymer particles is at least 10 isolated particles, preferably within the weight and volume ranges expressed above. The bulk of polyester particles exhibit the characteristics expressed herein as an average across a random sampling of 10 or more particles in the bulk of particles. As in any manufacturing process, it is possible to obtain anomalous particles which exhibit characteristics either inside or outside of those stated herein. The particles of the invention, however, exhibit the stated characteristics across a bulk, and these characteristics can be measured by taking a random sampling of at least ten particles and determining the stated characteristics as an average across the ten particles. All ten particles may be measured together in one analysis, or each particle may be separately analyzed.

The bulk of polyester polymer particles is desirably packaged into a container. Examples of suitable containers to hold the particles are storage silos to hold the particles while they await shipment from one location to another. Another example of a container is a dryer hopper attached to an extruder or injection molding machine. Another example of a container to hold the particles is a shipping container, such as a Gaylord box, a crate, a railcar, a trailer that can be attached to a truck, a drum, a cargo hold on a ship, or any other suitable package used to transport particles. Thus, there are provided containers with particles which are finished and ready for shipment or in shipment to a customer for converting the pellets to an article. The particles have been subjected by the particle manufacturer to all the processing conditions needed to produce a particle with characteristics acceptable to its customers who convert the pellets to articles. In the embodiment where the pellets may occupy a dryer hopper, the converter of pellets places the bulk of the pellets into the dryer hopper and removes residual moisture from the pellets to prevent excessive IV degradation during melt processing.

In all these embodiments, the particles in the containers have at a minimum the following characteristics:

A) an It.V. of at least 0.72 dl/g, and

B) 10 ppm or less of residual acetaldehyde; and

C) at least two melting peaks, wherein one of said at least two melting peaks is a low peak melting point within a range of 140° C. to 220° C. and having a melting endotherm area of at least the absolute value of 1 J/g, or having one or more melting points which, when measured on a first DSC scan, has a trace departing from a baseline in the endothermic direction at a temperature of less than or equal to 200° C., or less than or equal to 190° C., or less than or equal to 180° C.

In a preferred embodiment, the bulk of particles are not solid state polymerized, and in a more preferred embodiment, there is provided a bulk of particles in a container, most preferably a shipping container, which have not been solid state polymerized.

The polyester polymer particles are solid at 25° C. and 1 atmosphere. The polyester particles have sufficient melt strength to make them suitable for container applications such as bottles and trays. The It.V. of the polyester particles is at least 0.72 dL/g. For example, the It.V. of the polyester particles can be at least 0.75 dL/g, or at least 0.78 dL/g, or at least 0.81 dL/g, and up to about 1.2 dL/g, or 1.1 dL/g. In a related embodiment, the polyester polymer particles described above have an It.V. of at least 0.75 dL/g.

The "polyester polymer" of this invention is any thermoplastic polyester polymer. Polyester thermoplastic polymers of the invention are distinguishable from liquid crystal polymers and thermosetting polymers in that thermoplastic polymers have no appreciable ordered structure while in the liquid (melt) phase, they can be remelted and reshaped into a molded article, and liquid crystal polymers and thermosetting polymers are unsuitable for the intended applications such as packaging or stretching in a mold to make a container.

The polyester polymer of the invention contains ethylene terephthalate repeat units in the polymer chain. More preferred are polyester polymers and copolymers which comprise:

(a) a carboxylic acid component comprising at least 80 mole % of the residues of terephthalic acid or derivates of terephthalic acid, or mixtures thereof, and (b) a hydroxyl component comprising at least 80 mole % of the residues of ethylene glycol, based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of said polyester product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the said polyester product refers to the portion of said compound(s) which remains in the said polyester product after said compound(s) is condensed with a compound(s) containing hydroxyl group(s) and further polycondensed to form polyester polymer chains of varying length.

More than one compound containing hydroxyl group(s) or derivatives thereof can become part of the polyester polymer product(s). All the compounds that enter the process containing hydroxyl group(s) or derivatives thereof that become part of said polyester product(s) comprise the hydroxyl component. The mole % of all the compounds containing hydroxyl group(s) or derivatives thereof that become part of said product(s) add up to 100. The "residues" of hydroxyl functional compound(s) or derivatives thereof that become part of said polyester product refers to the portion of said compound(s)

which remains in said polyester product after said compound(s) is condensed with a compound(s) containing carboxylic acid group(s) or derivative(s) thereof and further polycondensed to form polyester polymer chains of varying length.

The mole % of the hydroxyl residues and carboxylic acid residues in the product(s) can be determined by proton NMR.

In a preferred embodiment, the polyester polymer comprises:
(a) a carboxylic acid component comprising at least 90 mole %, or at least 92 mole %, or at least 96 mole % of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 90 mole %, or at least 92 mole %, or at least 96 mole % of the residues of ethylene glycol,
based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalene dicarboxylic acid include $C_1$-$C_4$ dialkylterephthalates and $C_1$-$C_4$ dialkylnaphthalates, such as dimethylterephthalate and 2,6-dimethylnaphthalate.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "carboxylic acid". It is also possible for tricarboxyl compounds and compounds with a higher number of carboxylic acid groups to modify the polyester.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

As modifiers, the polyester polymer may preferably contain such comonomers as isophthalic acid, naphthalene dicarboxylic acid, cyclohexanedimethanol, and diethylene glycol.

The polyester pellet compositions may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst.

Once the polyester polymer is manufactured in the melt phase polymerization, it is solidified. The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The polyester polymer of the invention is partially crystallized to produce semi-crystalline particles. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized. Optionally, the crystallized polyester may be solid stated according to known methods.

The crystallization and annealing are effective to impart the desired degree of crystallinity and melting point characteristics to the polyester polymer. The polyester polymer particles have at least two melting peaks on a DSC first heating scan, wherein one of said at least two melting peaks is a low peak melting point with a peak temperature within a range of 140° C. to 220° C. and having a melting endotherm area of at least the absolute value of 1 J/g. By melting point is meant the peak temperature of endotherms on a differential scanning calorimeter (DSC) which increases the temperature upward at a rate of 20° C./min on a sample weighing about 10 mg. It is not necessary to run a DSC analysis on the particles, but only that the particles have the stated morphology. The stated tests reveal the properties of the polymer and need only be run to determine whether or not a polymer has or does not have the stated characteristics.

In one embodiment, the polyester polymer particles exhibit at least two melting peaks. The low peak melting point is considered to be $T_{m1a}$ as explained further below, which is classified as a melting peak when the area under the heating curve on a DSC first heating scan is at least the absolute value of 1 J/g. If the area under the curve is less than 1 J/g, the uncertainty around whether a curve is truly a peak or not becomes too high. Moreover, one can determine that at least two peaks exist when the endotherm(s) on a DSC scan exhibit at least four slopes, a first slope departing from a baseline, a second slope of opposite sign from the first slope, and a third slope of opposite sign from the second slope, and a fourth slope of opposite sign from the third slope. The temperature locations of the peaks on each curve define the melting points on that heating curve. For the purposes of computing the area of the melting endotherms, the dividing point between two peaks is at the point between the peaks where the curve most closely approaches the baseline.

In this embodiment, if two or more peaks appear on a heating curve from a DSC first heating scan, then the first peak is the low peak melting point $T_{m1a}$, and the second peak is the high peak melting point $T_{m1b}$ such that $T_{m1a}<T_{m1b}$. The low peak melting point of the polymer particles is within a range of 130° C. to 220° C. Preferably the low peak melting point of the polyester polymer has a peak temperature of at least 140° C., or at least 150° C., or at least 160° C., or at least 170° C., and does not exceed 210° C., or 200° C., or 195° C.

In some cases, particularly at low crystallinity due to crystallization at relatively low temperatures and/or for short times, rearrangement of crystals can occur so rapidly in the DSC instrument during first heating scans with scan rates of 20° C./min that the low melting point is not detected. The low melting point can then be seen by increasing the temperature ramp rate of the DSC instrument and using smaller samples. If the sample has a low melting peak, it will be seen at higher scan rates. Scan rates up to 500° C./min can be used. For solid-stated samples that experienced relatively high temperatures for relatively long times and exhibit only a single melting peak at a 20° C./min scan rate, no low melting peak is expected even at higher scan rates.

In some instances, depending on the specific thermal history of the polyester resin pellets, the DSC heating curve obtained upon a DSC first heating scan may exhibit an endothermic shoulder on the low-temperature side of the principal endothermic melting peak rather than two separate and well defined melting peaks. A low-temperature endothermic shoulder of this type is defined by means of the curve obtained by taking the first derivative with respect to temperature of the original DSC curve. The shoulder appears as a peak in the derivative curve. With increasing temperature, the derivative curve departs the baseline (at temperature A) in the endothermic direction at a temperature preferably less than or equal to 200° C., or less than or equal to 190° C., or less than or equal to 180° C., then achieves a maximum displacement from the baseline, and then reverses direction and approaches or returns to the baseline but does not cross the baseline. At still higher temperatures, the derivative curve reverses direction (at temperature B) and again bends towards the endothermic direction, marking the beginning of the primary melting peak in the original DSC curve. The heat of melting represented by the shoulder corresponds to the area under the original DSC curve between temperatures A and B, and must be greater than or equal to the absolute value of 1 J/g to be considered a true shoulder. Those skilled in the art recognize that minor instrumental noise in the original DSC curve can appear as high-amplitude short-duration spikes in the derivative curve. Such noise can be filtered out by requiring that all features in the derivative curve spanning less than 5° C. be ignored.

Extremely high melting points, e.g. those on the order of 230° C. or more, are not needed to effectively dry the polyester polymer particles at temperatures ranging from 140-190° C. as once thought. Now there is provided a polymer particle which is both crystallized and has a lower melting point to provide the flexibility, if one so chooses, of lowering the melt processing temperature by 1° C. or more, or by about 3° C. or more, and thereby reduce the level of acetaldehyde generated without having to lower the drying temperature in the dryer hopper feeding the melt processing zone. Even though the potential exists for particles having a melting point of 230° C. or more to be dried at higher temperatures on the order of 200° C. or more, the practical drying temperature limit is about 190° C. in any case because at above 190° C., the particle begins to discolor in air. Also, it is desirable to use pellets which provide the flexibility of lowering the peak set-point temperature to the heating elements. Either course of action, or both combined, will lower the amount of acetaldehyde generated in the melt processing zone, and also will decrease the cooling time required for a molded article.

In another embodiment, the polymer particles may have one or more melting points which, when measured on a DSC first heating scan, have a heating curve departing from a baseline in the endothermic direction at a temperature of less than or equal to 200° C., or less than or equal to 190° C., or less than or equal to 180° C. In this embodiment, the DSC heating curve may exhibit only one melting point, or it may exhibit two melting points. In any event, the heat history of the particles is such that they exhibit at least one melting point which, when measured on a DSC first heating scan, displays a heating curve which begins to depart from the baseline at a temperature of less than or equal to 200° C. In this embodiment, the area of the endotherm curve represented by the melting peak departing from the baseline below or equal to 200° C. is at least the absolute value of 1 J/g.

In all embodiments, the area of the endotherm curve may be at least the absolute value of 1.5 J/g, or at least the absolute value of 2 J/g.

In a preferred embodiment, the crystallizer conditions are adjusted to produce polymer particles having a degree of crystallinity within a range of at least 20% and a maximum degree of crystallinity $T_{cmax}$ defined by the equation:

$$T_{cmax} = 50\% - CA - OH$$

where CA is the total mole % of all carboxylic acid residues other than terephthalic acid residues, based on 100 mole % of carboxylic acid residues, and OH is the total mole % of all hydroxyl functional compound residues other than ethylene glycol residues, based on 100 mole % of hydroxyl functional compounds residues. The degree of crystallinity in the polyester composition is less than that found in conventional commercial pellets which normally exceed 55%, and even more than 60%. At a degree of crystallinity less than 20%, the tendency of the particles to stick to each other and to the dryer equipment is too great. By maintaining the degree of crystallinity within the limits expressed above, in combination with the other features of the invention, energy costs in the melt processing zone are reduced, such as the amperage to the screw motor or the power to the heating elements.

In the preferred embodiment wherein the polyester polymer is crystallized to a degree within the formula, a polymer containing solely terephthalic acid and ethylene glycol residues, also commonly known in this industry as a homopolymer, can attain a maximum degree of crystallinity of 50%. A polyester polymer modified with a starting material other than terephthalic acid or ethylene glycol will have a degree of crystallinity less than 50%. For example, a polyethylene terephthalate polymer modified with 2 mole % isophthalic acid residues and 2.7 mole % diethylene glycol residues will have a maximum degree of crystallinity of 45.3% (50-2-2.7).

More preferably, the pellets are crystallized to a degree of crystallization of at least 25%, or at least 30%, or at least 32%. While there is no preferred upper limit below the maximum degree of crystallinity calculated as set forth in the formula, in many cases the degree of crystallinity does not exceed 45%, or not more than 40%.

Pellet melting temperature and the degree of crystallinity are determined using Differential Scanning calorimetry (DSC). The sample weight for this measurement is 10±1 mg and the sample consists of either (1) a portion of a single pellet, or more preferably (2) a sample taken from several grams of cryogenically ground pellets. The first heating scan is performed. The sample is heated from approximately 25° C. and proceeds upward to about 290° C. at a rate of 20° C./minute. The absolute value of the area of the melting endotherms (one or more) minus the area of any crystallization exotherms is determined. This area corresponds to the net heat of melting and is expressed in Joules/gram. The heat of melting of 100% crystalline PET is taken to be 119 Joules/gram, so the weight fraction crystallinity of the pellet is calculated as the net heat of melting divided by 119. To obtain the weight. % crystallinity, the weight fraction crystallinity is multiplied by 100. Unless otherwise stated, the melting point in each case is also determined using the same DSC scan.

The percent crystallinity is calculated from both of:
Low peak melting point: $T_{m1a}$
High peak melting point: $T_{m1b}$ Note that in some cases, particularly at low crystallinity due to crystallization at relatively low temperatures and/or short times, rearrangement of crystals can occur so rapidly in the DSC instrument during first heating scans with scan rates of 20° C./min that the true, lower melting point is not detected. The lower melting point can then be seen by increasing the temperature ramp rate of the DSC instrument and using smaller samples. A Perkin-Elmer Pyris-1 calorimeter is used for high-speed calorimetry. The specimen mass is adjusted to be inversely proportional to the scan rate. About a 1 mg sample is used at 500° C./min and about 5 mg are used at 100° C./min. Typical DSC sample pans are used. Baseline subtraction is performed to minimize the curvature in the baseline.

The low peak melting point and degree of crystallinity of the polyester polymer are obtained by and influenced by a number of crystallization conditions and other factors. These conditions and factors include controlling the temperature conditions applied to the polymer during crystallization, the residence time within the crystallization zone, the nature of the polymer, the efficiency of the medium used to crystallize the polymer, and the strain undergone by the polymer. Those of skill in crystallizing polyester polymer are aware of the suitable conditions in conventional crystallizers to adjust the melting point and the degree of crystallinity, and can obtain polymers having a melting point and a degree of crystallinity within the stated ranges for a given polymer composition. For example, mild thermal crystallization temperatures of 100° C. to 200° C. can be used at residence times ranging from 1 minute to 3 hours, the exact conditions depending upon the nature of the polymer. While these variables affect both the melting point and the degree of crystallization of the polymer, not all polyester polymers crystallized to the same degree of crystallinity will have the same melting points, and not all polyester polymers having the same melting points will necessarily have the same degree of crystallinity. Polyester polymers of varying compositions will attain different melting points from other polyester polymers even at the same degrees of crystallinity. Processing separate samples of compositionally identical polyester polymers at varying residence times under the same temperature conditions will also produce polyester polymers with varying degrees of crystallinity. Accordingly, the degree of crystallization can vary among two polymers of the same composition. Also, the melting point can vary among two polymers of different composition even if their degree of crystallinity is identical.

The polyester polymer composition is made from at least 75% virgin polyester polymer, more preferably at least 78 wt. %, and can be 89 wt. % or more, or 95 wt. % or more virgin material, or entirely of virgin material. Virgin material may include scrap or regrind polymer, but is distinguished from post consumer recycle polymer. However, while virgin material may contain scrap or regrind material, in one embodiment, scrap or reground material is absent from the virgin polymer.

In addition to the melt phase polymerization process described above to make the virgin polyester polymer to a molecular weight suitable for container applications, i.e. It.V.=/>0.72 dig, followed by thermal crystallization at relatively mild temperatures, e.g. 100° C. to 200° C., other processes can also be used to make the polymer compositions of the invention. For example, a virgin polymer with a level of crystallinity and melting point outside of the ranges can be remelted, for example in an extruder, followed by thermal crystallization at relatively mild temperatures (100 to 200° C.). Alternatively, following melt-phase polymerization to an intermediate molecular weight (It.V. of 0.20 dig to 0.70 dL/g), the polyester can be crystallized at mild temperatures to a degree of crystallization within the stated range, followed by solid-state polymerizing also at mild temperatures ranging from 170° to 200° C. to increase the It.V. to that suitable for container applications, although in this latter case, the residence time in the solid state polymerization zone is either increased, the pressure further decreased, the inert gas flow rate increased, or any combination thereof.

Preferably, the polyester polymer is manufactured in a melt phase polycondensation reaction to an It.V. of at least 0.72 dL/g. In another preferred embodiment, there is provided a shipping container containing polyester particles which have not been solid-state polymerized and have the It.V., melting point, and AA characteristics described herein. In another embodiment, the particles are fed into a dryer followed by melt processing the particles to form an article, in which the particles have not been solid-state polymerized and have the characteristics described above.

These embodiments are preferred because pellets subjected to a solid state polymerization process are typically first crystallized to impart a degree of crystallinity and a melting point sufficiently high to avoid sticking at the high temperature conditions applied in the solid state polymerization zone. The crystallization process preceding a solid state polymerization process generally imparts to the pellets high degrees of crystallinity to mitigate agglomeration in the solid state reactors which run at high temperatures. The pellets obtained from the solid stating process generally have high melting points of about 220° C. or more. The high melting points have the disadvantage of increasing the temperature of the polymer melt in the extruder by a few degrees, thereby increasing the cooling time required for molded products which can increase the cycle time of the machine and increase the potential for more acetaldehyde formation. In addition, pellets obtained from solid state polymerization processes also tend to have a high degree of crystallinity, in excess of about 50%, which increases the latent heat of fusion, thereby increasing the energy required to melt the particles. Finally, in the solid state polymerization process, the high temperatures applied to the polymer for long times can at times actually over-anneal the polymer, with the effect that some particles do not completely melt in the melt processing zone and thereby cause deformities in the molded or extruded product. Accordingly, it is preferred not to solid state polymerize the particles, and to provide particles with suitable It.V. made in the melt phase process for the production of the particles.

The polyester particles of the invention contain 10 ppm or less acetaldehyde (as measured by ASTM F2013-00 "Determination of Residual Acetaldehyde in Polyethylene Terephthalate Bottle Polymer Using an Automated Static Head-Space Sampling Device and a Capillary GC with a Flame Ionization Detector"), and more desirably, about 7 ppm or less, or 3 ppm or less residual acetaldehyde ("AA"). This may be accomplished by gas stripping the AA from the particles. Alternatively or in addition to gas stripping, an acetaldehyde scavenger may be added to the polymer, which has the attendant advantage of also reducing the acetaldehyde generation rate. If the scavenger is added after the AA stripping is essentially complete, the scavenger will lower the amount of AA in the molded article, such as a bottle perform, by reacting with AA that is formed upon melting. If an excess of scavenger is added prior to the AA stripping or instead of the AA stripping, there may be some that is not consumed and can lower the amount of AA in the molded article. Alternatively, there may be two or more addition points for an AA scavenger.

In a gas stripping operation, a gas such as air or an inert gas such as nitrogen is contacted with the polyester polymer particles either co-current or countercurrent, preferably countercurrent to the flow of the particles in a vessel in a continuous or batchwise process, preferably a continuous process. The temperature of the gas introduced into the AA stripping vessel is not particularly limited, but preferably from ambient to 40° C., and more preferably about ambient. The temperature of the gas exiting the stripping vessel will approximate the temperature of the pellets introduced into the vessel. Thus, if particles are introduced at 100° C., the exit temperature of the gas will be about 100° C.+/−20° C. The temperature of the gas exiting the vessel should not exceed the temperature at which the molecular weight of the particles is advanced in the solid state. The residence time of the particles depends on the gas temperature and particle mass/gas ratio, but in general, the residence time ranges from 1 hour to 24 hours. The gas composition is not particularly limited, and includes nitrogen, carbon dioxide, or ambient air. The gas does not need to be dried, since the function of the gas is not to dry the pellets but to strip residual AA from the pellets. If desired, however, the gas may be dried.

While gas stripping of acetaldehyde may also occur in the dryer feeding the extruder for making an article, it is preferred to feed the dryer with polymer particles already having 10 ppm or less of residual acetaldehyde in order to reduce the gas flow used in the dryer and/or improve the quality of the articles made from the extruder. Moreover, in an AA stripping process, dry gas is not required to strip the AA from the particles, whereas in a drying process, a stream of dried air is circulated through the particles primarily to reduce the moisture on or in the particles with the secondary advantage of also removing AA. Thus, in an AA stripping process, ambient air can be and preferably is used as the stripping medium.

Thus, in one embodiment, particles having an It.V. of at least 0.72 dL/g and either a degree of crystallinity within a range of 20% to $T_{cmax}$, or a low peak melting point in the range of 130° C. to 220° C., or both, are fed to a vessel, preferably through the upper end of a vessel, as hot particles (e.g. 100° C. to 180° C.) to increase the efficiency of AA stripping and form a bed of pellets flowing by gravity toward the bottom end of the vessel while a countercurrent flow of gas such as ambient air is circulated through the bed, said gas introduced into the vessel at a temperature ranging from ambient conditions to 180° C., or from ambient to 40° C., to thereby reduce the level of residual AA on the particles introduced into the vessel. The particles are withdrawn from the vessel within about 5 to 30 hours of their introduction into the countercurrent stream of gas. While the vessel can be pressurized, it is preferably not pressurized except by the pressure created from the gas flow. The vessel is desirably operated at about 0-5 psig, or ambient pressure.

The gas can be introduced into the vessel by any conventional means, such as by a blower, fans, pumps, and the like. The gas may flow co-current to or countercurrent to or across the flow of particles through the vessel. The preferred flow of gas through the bed of particles is countercurrent to the particle flow through the bed. The gas can be introduced at any desired point on the vessel effective to reduce the level of acetaldehyde in the particles fed to the vessel. Preferably, the gas introduction point is to the lower half of the bed height in the vessel, and more preferably to the lower ¼ of the bed height. The gas flows through at least a portion of the particle bed, preferably through at least 50 volume % of the bed, more preferably through at least 75% of the particle bed volume. Any gas is suitable for use in the invention, such as air, carbon dioxide, and nitrogen. Some gases are more preferred than others due to the ready availability and low cost. For example, the use of air rather than nitrogen would lead to significant operating cost improvements. It was believed that the use of nitrogen gas was required in operations which pass a hot flow of gas through a bed of particles at temperatures above 180° C., such as in a crystallizer, because nitrogen is inert to the oxidative reactions which would otherwise occur between many polyester polymers and ambient oxygen resulting in pellet discoloration. However, by keeping the process temperature low such that the gas exiting the vessel does not exceed 190° C., particle discoloration is minimized. In one embodiment, the gas contains less than 90 vol % nitrogen, or less than 85 vol % nitrogen, or less than 80 vol % nitrogen. In another embodiment, the gas contains oxygen in an amount of 17.5 vol % or more. The use of air at ambient composition (the composition of the air at the plant site on which the vessel is located), or air which is not separated or purified, is preferred. Desirably, ambient air is fed through the gas inlet. While the air can be dried if desired, it is not necessary to dry the air since the object is to remove acetaldehyde from the particles.

Any vessel for containing particles and allowing a feed of gas and particles into and out of the vessel is suitable. For example, there is provided a vessel having at least an inlet for gas, and inlet for the polyester polymer particles, an outlet for the gas, and an outlet for the finished particles. The vessel is preferably insulated to retain heat. The gas inlet and the finished particle outlet are desirably located below the gas outlet and the particle inlet, preferably with the gas outlet and particle inlet being toward the top of the vessel and the gas inlet and finished particle outlet being toward the bottom of the vessel. The gas is desirably introduced into the bed within the vessel at about ½ or ¼ of the bed height within the vessel. The particles are preferably introduced at the top of the vessel, and move by gravity to the bottom of the vessel, while the gas preferably flows countercurrent to the direction of the particle flow. The particles accumulate within the vessel to form a bed of particles, and the particles slowly descend down the length of the vessel by gravity to the finished particle outlet at the bottom of the vessel. The bed height is not limited, but is preferably at a substantially constant height in a continuous process and is at least 75% of the height of the vessel containing the particles within the stripping zone. The vessel preferably has an aspect ratio L/D of at least 2, or at least 4, or at least 6. While the process can be conducted in a batch or semi batch mode in which as the particles would not flow and the stream of gas can be passed through the bed of particles in any direction, the process is preferably continuous in which a stream of particles continuously flows from the particle inlet to the finished particle outlet as the particles are fed to the vessel.

A suitable gas flow rate introduced into the vessel and passing through at least a portion of the particle bed is one which is sufficient to reduce the amount of residual acetaldehyde on the particles introduced into the vessel. For example, for every one (1) pound of particles charged to the vessel per hour, suitable gas flow rates introduced into the vessel are at least 0.0001 standard cubic feet per minute (SCFM), or at least 0.001 SCFM, or at least 0.005 SCFM. High flow rates are also suitable, but not necessary, and the gas flow rate should be kept sufficiently low to avoid unnecessary energy consumption by the gas pumps, fans, or blowers. Moreover, it is not desired to unduly cool the particles or dry the particles because the achievement of either or both of these objectives typically requires the use of high gas flow rates. The gas flow rate is preferably not any higher than 0.15 SCFM, or not higher than 0.10 SCFM, or not higher than 0.05 SCFM, or even not higher than 0.01 SCFM for every one (1) pound of charged particles per hour.

Alternatively, or in addition, an acetaldehyde scavenger may be added to the polyester polymer either near the end of the melt-phase production of the polymer or by melt blending the high IV particles with the scavenger. Addition of scavenger to the melt-phase production of polymer should be done as late as possible, preferably near the end of the finisher stage, i.e., near the end of the last stage under vacuum, or more preferably after the finisher stage. Compounding to form polymer concentrates with relatively high loadings of an acetaldehyde scavenger is known in the art. The polyester concentrate contains at least about 0.5 wt. % of the scavenging component in the polyester. These concentrates can be added via an extruder, or liquid dispersions of said scavenging component can be added via a pump, near the end of the melt-phase production of the polymer while the polymer is still molten. Alternatively, these polymer concentrate particles can be blended with polymer particles at temperatures which maintain both types of particles in the solid phase. The blend of concentrate and polymer particles can then be fed to an extruder, preferably an extruder used to mold plastic articles, such as bottle preforms. A melt-phase process to produce polymer particles can employ a combination of acetaldehyde stripping and acetaldehyde scavengers added near the very end or exit of the melt-phase process. The particles exiting the stripping zone can be blended with concentrate particles at temperatures which maintain both types of particles in the solid form.

Examples of effective acetaldehyde scavengers are any of those known in the art, and in particular, amino-terminated polyamides having a molecular weight of less than 25,000 g/mol, or less than 20,000 g/mol, or less than 12,000 g/mol, and preferably the reaction products of adipic acid with m-xylylene diamine. The end groups of these polyamides form 'imines' with AA and virtually bind it into the polyamide chain ends. The amino-terminated polyamide acetaldehyde scavengers disclosed in U.S. Pat. Nos. 6,444,283 B1, 6,239,233, 5,340,884, 5,266,413, and 5,258,233, are incorporated herein by reference in their entirety. Alternatively, anthranilamide derivatives may be used, such as those disclosed under U.S. Pat. Nos. 6,762,275 and 6,274,212 B1, incorporated herein by reference in their entirety.

Once the polyester polymer particles are made with the stated properties, they may be fed to an extruder suitable to make containers or sheet after being dried to remove moisture from the particles. Accordingly, there is also provided a method of melt processing polyester polymer particles comprising:

A) drying polyester polymer particles in a drying zone to produce dried particles;
B) introducing the dried particles into an melting zone;
C) melting the polyester polymer particles in the melt processing zone, and
D) forming an article from the molten polymer;

wherein the polyester polymer particles introduced into the drying zone comprise at least 75% virgin polyester and have an It.V. of at least 0.72 dl/g, a residual acetaldehyde content of 10 ppm or less, and have at least two melting peaks, wherein one of said at least two melting peaks is a low peak melting point within a range of 140° C. to 220° C. and having a melting endotherm area of at least the absolute value of 1 J/g.

The drying zone comprises a dryer. Dryers feeding a melt processing zone reduce the moisture content of particles. Moisture in or on particles fed into a melt extrusion chamber will cause the melt to lose excessive It.V. at melt temperatures by hydrolyzing the ester linkages with a resulting negative impact on the melt flow characteristics of the polymer and stretch ratio of the preforms when blown into bottles. Therefore, prior to extrusion the particles are dried with a flow of hot dry gas at a temperature of 140° C. or more to drive off most of the moisture on and in the particle. It is desirable to dry the particles at high temperatures of 140° C. or more to decrease the residence time of the particles in the dryer and increase throughput. In general, the typical residence time of particles in the dryer at conventional temperatures (140° C. to 190° C.) will be on average from 0.75 hours to 12 hours.

Any conventional dryer can be used. The particles may be contacted with a flow of heated air or inert gas such as nitrogen to raise the temperature of the particles and remove volatiles from inside the particles, and may also be agitated by a rotary mixing blade or paddle. The flow rate of the heating gas, if used, is a balance between energy consumption, residence time of particles, and preferably avoiding the fluidization of the particles. Suitable gas flow rates range from 0.05 to 100 SCFM for every pound per hour of particles discharged from the dryer, preferably from 0.2 to 5 SCFM per lb/hr of particles.

Once the particles have been dried, they are introduced into a melt processing zone to form molten polyester polymer, followed by forming an article such as a sheet or a molded part. Any conventional technique used to melt particles and form articles therefrom can be used. Suitable melt processing zones include extruders equipped with a barrel, one or more screws in the barrel, a motor to turn the screw, heating elements to direct heat through the barrel to the particles, and a die plate through which the molten polymer is forced. The die may be a sheet die, optionally connected to a thermoforming mold. Another melt processing zone is an injection molding machine equipped with the same features, except a sprue is used instead of a die through which the polymer is forced into a runner system that directs the polymer into one or more mold cavities. An example of a molded part includes a bottle preform (parison).

The barrel may contain one or more temperature zones. The temperature zone of maximum temperature applied along the length of the barrel is typically closest to the die plate in an extruder. The maximum temperature in the zones across the length of the barrel may range from a minimum sufficient to melt the pellets up to a temperature where the polymer degrades significantly or burns. Typically, in an extruder barrel, the maximum temperature applied to the barrel in the process of the invention can be as low as about 250° C., or 255° C., up to about 305° C. Suitable backpressures and shear rates vary depending upon the particular peak barrel temperature, desired throughput, the polymer composition, and the morphology of the particles. In general, backpressures may range from 0 to 700 psig, or about 100 to 200 psig. Suitable screw speeds are within a range of 40 to 100 rpm, and suitable melt residence times in the barrel range from 30 seconds to 3 minutes.

By using particles having the stated It.V., melting points, and low level of residual AA, optionally and preferably also with the stated degrees of crystallinity, the acetaldehyde level generated during the melt processing of the polyester polymer into an article can be lowered. By using the particles of the invention, one or more of the following advantages can be realized if the operating parameters in the melt processing zone are adjusted accordingly:

1. Lower energy consumption to the melt processing zone. In the case of an extruder or injection molding machine, the power (amperage) applied to the screw motor or to the heaters or to both can be lowered.

2. The residence time of the melt in a barrel can be lowered, or the overall cycle time of the melt can be lowered, thereby also reducing the acetaldehyde generated in the melt and possibly increasing throughput of the machine.

3. The screw may be rotated at higher revolutions without increasing power consumption, thereby also reducing the amount of acetaldehyde generated in the melt.

4. The temperature applied to the barrel by the heating element can be lowered, thereby also reducing the amount of acetaldehyde generated in the melt.

5. If desired, the processing step of solid state polymerization can be avoided completely.

6. The degree of crystallinity can be lowered, thereby saving energy costs to operate the crystallization equipment.

Accordingly, in one process embodiment, the energy consumption of an extruder or injection molding machine can be reduced by:

A) if a drying zone is present, drying the particles in the drying zone to produce dried particles;

B) feeding the particles into a melt processing zone, or if a drying zone is present, feeding dried particles into a melt processing zone;

C) melting the particles in the melting processing zone, and

D) forming articles from the melt;

wherein the polyester polymer particles fed to the melt processing zone or to the dryer if present comprise at least 75% virgin polyester, have an It.V. of at least 0.72 dl/g, have a residual acetaldehyde content of 10 ppm or less, and have at least two melting peaks in which one of said at least two melting peaks is a low peak melting point within a range of 140° C. to 220° C. and having a melting endotherm area of at least the absolute value of 1 J/g; and the melt processing zone comprises a barrel, a die or orifice, and a heating element directing heat to the barrel; and the temperature setting of a heating element directing the maximum temperature to a zone on the barrel is established, said temperature setting being lower in said zone than would be applied to melt process the same polyester polymer particles having a melting point higher than 220° C. to form the same article having substantially the same level of haze and applying all of the same settings in the melt processing zone other than the temperature setting.

In this operation, the temperature setting on the heating element can be lowered by about at least 1° C., or by about 1° C. to 5° C. or more since the low peak melting point of the polyester polymer of the invention is within 130° C. to 220° C. Although the differential between a polymer having a low peak melting point or a single peak melting point of about 240° C. or more and a polymer having a low peak melt point of 220° C. or less is 20° C. or more, this difference in melting points does not translate into the ability to lower the extruder temperature by 20° C. or more since the minimum processing setpoint temperature for successful processing of these two polymers does not change this drastically. However, the difference in melt points will affect the minimum processing setpoint temperature in the melt processing zone, where every degree difference significantly impacts the acetaldehyde generation rate.

In this and other process embodiments identified below, the invention is practiced within the claims without the necessity of actually making a polyester polymer particle having a low peak melting point exceeding 220° C. and melting it in the melt processing zone as a benchmark. Rather, the process invention is practiced without establishing the benchmark. The benchmark only serves as a useful measuring tool to determine if the settings to, for example, the heating elements, motor power, or the residence time and screw speed as practiced are within the scope of the invention, and the invention can be practiced without actually taking such a measurement.

The polyester particles of the invention also require less energy to melt relative to the total power that would be applied to the motor and to the heating element at the same settings to melt process a polyester polymer having a degree of crystallinity exceeding $T_{cmax}$ but having the same It.V, same composition, and at an equivalent melt residence time within the melt processing zone to form the same article having substantially the same level of haze. The amperage demand from the heating element and the screw motor is lower relative to the amperage demand when using the particles with higher degrees of crystallinity under otherwise identical conditions at the same heater element setting and rpm on the screw.

By using the particles of the invention with lower degrees of crystallinity, one will find that the total power draw to the heating elements and the screw motor will be lowered.

If one desires to establish a benchmark, the settings to the heating element and the motor attached to the screw should remain the same, and the voltage to the heating element and motor should also remain the same, while measuring the effect on the amperage. Other conditions applied to the extruder should also remain the same, such as the residence time in the barrel; the mold shape; screw speed; temperature settings on the barrel, the sprue, and the nozzle tips; mold fill time; hold time; cooling time; the mold shape; and at about the same haze level in the molded article. The haze level can be measured by visual inspection with the eye having 20/20 vision in a manner described below in the working examples. Alternatively, the haze level can be measured by instruments under standard ASTM tests or any industry recognized test, so long as the same test methods are used on the benchmark and the articles made with the particles of the invention.

Since the polyester particles of the invention require less energy to melt, the benefits can be manifested in other ways besides reduced consumption of total power to the screw motor and heating elements. For example, by using the particles of the invention, the same power can be applied to the motor to deliver a higher screw speed, thereby optionally increasing the throughput and lowering the residence time of the melt in the barrel.

Accordingly, there is also provided another melt processing embodiment comprising:
 A) if a drying zone is present, drying the particles in the drying zone to produce dried particles;
 B) feeding the particles into a melt processing zone, or if a drying zone is present, feeding dried particles into a melt processing zone;
 C) melting the particles in the melting processing zone, and
 D) forming articles from the melt;
wherein the polyester polymer particles fed to the melt processing zone or to the dryer if present comprise at least 75% virgin polyester, have an It.V. of at least 0.72 dl/g, have a residual acetaldehyde content of 10 ppm or less, and have at least two melting peaks in which one of said at least two melting peaks is a low peak melting point within a range of 140° C. to 220° C. and having a melting endotherm area of at least the absolute value of 1 J/g; and the melt processing zone comprises a barrel, a heating element directing heat to the barrel, a screw rotating within the barrel, and a screw motor; and the screw revolutions are at a setting which is higher than the screw revolutions that would be applied to melt process, at the same power, a polyester polymer having the same It.V, same composition, a low peak melting point (or sole peak melting point where two peaks do not exist) greater than 220° C., to form the same article having substantially the same level of haze.

It is not always the case that the screw speed has to be increased in order to lower the residence time of the melt in the extruder. In an injection molding process, the molten polymer has a residence time in the entire melt delivery system ahead of the screw which often remains stationary (no forward motion) until the mold is cleared and the melt has reached its equilibrium temperature above its high peak melting point, after which the melt is forced through a sprue by a ram or the rotation of the screw into the mold or a shooting pot. By using particles which have a lower melting point, less energy is required to obtain a melt at an equilibrium temperature. This may be accomplished at a lower temperature and/or with a shorter residence time. Whether or not the screw speed is increased or changed, the residence time of the melt in the barrel can be decreased by using the particles described above, optionally with the melting point characteristics described herein. By lowering the temperature and/or residence time of the polymer melt in the barrel, the amount of AA generated during processing can be lowered, and thus the residual AA level in molded article can also be lowered.

Therefore, another embodiment is provided for melt processing polyester polymer particles comprising:
 A) if a drying zone is present, drying the particles in the drying zone to produce dried particles;
 B) feeding the particles into a melt processing zone, or if a drying zone is present, feeding dried particles into a melt processing zone;
 C) melting the particles in the melting processing zone, and
 D) forming articles from the melt;
wherein the polyester polymer particles fed to the melt processing zone or to the dryer if present comprise at least 75% virgin polyester, have an It.V. of at least 0.72 dl/g, have a residual acetaldehyde content of 10 ppm or less, and have at least two melting peaks in which one of said at least two melting peaks is a low peak melting point within a range of 140° C. to 220° C. and having a melting endotherm area of at least the absolute value of 1 J/g; and the melt processing zone comprises a barrel, a heating element directing heat to the barrel, a screw rotating within the barrel, and a screw motor; and a melt residence time within the barrel is applied which is shorter than the melt residence time that would be applied to melt process, at all of the same other settings to the melt processing zone, a polyester polymer having the same It.V, same composition, a low peak melting point (or a sole peak melting point where two peaks do not exist) higher than 220° C., to form the same article having substantially the same level of haze.

In the melt processing zone to produce an article, or in the melt-phase process for making the polyester polymer, other components can be added to the composition of the present invention to enhance the performance properties of the polyester polymer. These components may be added neat to the bulk polyester, may added as a dispersion in a liquid carrier or may be added to the bulk polyester as a polyester concentrate containing at least about 0.5 wt. % of the component in the polyester let down into the bulk polyester. The types of suitable components include crystallization aids, impact modifiers, surface lubricants, stabilizers, denesting agents, antioxidants, ultraviolet light absorbing agents, metal deactivators, colorants, nucleating agents, acetaldehyde lowering compounds, reheat rate enhancing aids, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art and do not require extensive discussion. Any of these compounds can be used in the present composition.

In each of these embodiments, the articles of manufacture are not limited, and include sheet and bottle preforms. The bottle preforms can be stretch blow molded into bottles by conventional processes. Thus, there is also provided in an embodiment the bottles made from the particles of the invention, or made by any of the processes of the invention, or made by any conventional melt processing technique using the particles of the invention.

Not only may containers be made from particles made according to the process of this invention, but other items such as sheet, film, bottles, trays, other packaging, rods, tubes, lids, filaments and fibers, and other molded articles may also be manufactured using the polyester particles of the invention. Made from polyethylene terephthalate, beverage bottles suitable for holding water or carbonated beverages, and heat set beverage bottles suitable for holding beverages which are hot filled into the bottle are examples of the types of bottles which are made from the crystallized pellets of the invention.

The invention may now be further understood by reference to the following non-limiting illustrative examples.

COMPARATIVE EXAMPLE 1

In this example, virgin polyethylene terephthalate polymer modified with 3.0 mole % isophthalic acid and 2.7 mole % diethylene glycol and having an intrinsic viscosity of 0.84 dL/g was analyzed for its melting point and degree of crystallinity.

The polymer was commercially produced by the esterification of terephthalic acid with ethylene glycol, followed by prepolymerization and polymerization to an inherent viscosity of about 0.62 dL/g. The polymer was then continuously crystallized and solid-stated in a conventional process. The level of residual acetaldehyde in the pellets was less than 1 ppm as measured by ASTM F2013-00.

In each of the examples, about a 10 mg sample of the polymer was analyzed by a DSC first heating scan starting at about 25° C. and ramping up to 290° C. at a heat-up rate of 20° C./minute. The absolute value of the area of the melting endotherms (one or more) minus the area of any crystallization exotherms is determined. This area corresponds to the net heat of melting and is expressed in Joules/gram. The heat of melting of 100% crystalline PET is taken to be 119 Joules/gram, so the weight fraction crystallinity of the sample was calculated as the net heat of melting divided by 119 J/g. The initial melting point of the sample was also determined using the same DSC first heating scan.

In each of the examples, the percent crystallinity was calculated from both of the low peak melting point, $T_{m1a}$, and the high peak melting point, $T_{m1b}$, endotherms.

In each of the examples, the intrinsic viscosity was determined from solution viscometry in 60/40 wt/wt phenol/tetrachloroethane by the method described above.

The results in this example showed one endotherm with a $T_{m1b}$ melting point at 236° C. The area of the endotherm was measured at 57 J/g, indicating a degree of crystallinity of 47.9%.

EXAMPLE 2

This polyester polymer was modified with 3.0 mole % isophthalic acid, and contained about 3.6 mole % diethylene glycol. Its intrinsic viscosity was about 0.82 dL/g. The polyester polymer was produced by esterification of terephthalic acid with ethylene glycol followed by melt prepolymerization and polymerization to an intrinsic viscosity of about 0.82 dL/g. It was then crystallized in a continuous process by passing it through two horizontal jacketed elongated vessels which were agitated by a longitudinal shaft with radially-mounted paddles. The heating medium circulated through the jacket was set at 180° C., which yielded a temperature for the pellets exiting the vessel of about 165° C. Residence time of the polymer in the vessels was about 30 minutes. The level of residual acetaldehyde in the pellets was 125.6 ppm.

A 10 mg sample was analyzed by DSC according to the same procedure as set forth in Example 1. Two melting endotherms were observed, the lower of which at 180° C. is defined as the actual melting point. The area of the endotherm represented by the low melt peak $T_{m1a}$ was measured at 3.78 J/g, and the collective area of the endotherms was measured at 40.5 J/g, indicating about 34.0% crystallinity. This polyester would require about 16.5 J/g less energy to melt than the polyester described in Comparative Example 1.

EXAMPLE 3

This polyester polymer was also modified 3.0 mole % isophthalic acid, and contained about 3.6 mole % diethylene glycol. Its intrinsic viscosity was about 0.82 dL/g. This polymer was produced by the same melt-phase polymerization process described in Example 2, and then crystallized in a batch rotary double-coned dryer by heating the polymer up to 180° C. for several hours, then cooling back to ambient. The level of residual acetaldehyde in the pellets was 6.4 ppm.

A 10 mg sample was analyzed by DSC according to the same procedure as set forth in Example 1. Two melting endotherms were observed, the lower of which at 194° C. is defined as the actual melting point. The area of the endotherm represented by the low melt peak $T_{m1a}$ was measured at 8.20 J/g, and the collective area above the endotherms was measured at 44.4 J/g, indicating about 37.3% crystallinity. This polyester would require about 12.6 J/g less energy to melt than the polyester described in Comparative Example 1.

COMPARATIVE EXAMPLE 4

This polyester polymer was also modified with 3.0 mole % isophthalic acid, and contained about 3.6 mole % diethylene glycol. It was polymerized in the melt phase to an intrinsic viscosity of about 0.63 dL/g and then batch solid-stated to an intrinsic viscosity of about 0.98 dL/g. It was crystallized and then solid state polymerized in a batch rotary double-coned dryer by heating to about 210° C. and holding until the desired inherent viscosity was obtained before cooling. The level of residual acetaldehyde in the pellets was 0.5 ppm.

A 10 mg sample was analyzed by DSC according to the same procedure as set forth in Example 1. As in Example 1, a single melting endotherm was observed at 241° C., and was taken as the melting point of the polymer. The area of the endotherm was measured at 62.5 J/g, indicating about 52.5% crystallinity. This polyester requires about 5.5 J/g more energy to melt than the polyester described in Example 1.

COMPARATIVE EXAMPLE 5

The polyester polymer particles of Example 1 were injection molded to determine the minimum processing setpoint temperature at which they could be molded before unacceptable crystalline haze appeared in the preforms as determined by direct visual inspection of the preforms.

The injection molding was performed on a Husky LX160PET hot runner injection molding machine with robotic post mold cooling and with an 8 cavity, 24.6 gram, 20 ounce bottle preform mold. The injection molding conditions were a uniform temperature profile in the barrel and shooting pot at the prescribed temperature with nozzle tip heats of 40% and a sprue bushing heat of 10%. The pellets were first dried for 7 hours at 150° C. and then held at 65° C. until transferred to the hopper of the molding machine.

The machine was started up at a temperature of 275° C., with a uniform temperature profile across the barrel, shooting pot, and manifold zones. When the process temperatures had stabilized to within about +1-1° C. of the setpoint, about 6 minutes later samples of preforms were collected. The screw speed was set to 69 rpm with a backpressure of 128 psig.

Samples of preforms from each shot were collected. For one sample run, 8 preforms, 1 from each cavity, were collected for visual inspection of haze. A fill time of 2.86 seconds, a hold time of 6.5 seconds, a cooling time of 3.5 seconds, a transfer time of 2.19 seconds, and a recovery time of 3.31 seconds were employed to give an overall cycle time of approximately 18.4 seconds.

Visual inspection of the preforms was performed by illuminating the preform with a 3M overhead projector in an otherwise dark room. The preform was placed vertically with the open threaded neck contacting the top of the transparent plate over the lamp. Normal amounts of gate crystallinity, generally distributed concentrically and evenly about the gate vestige, were judged to be acceptable. Unacceptable haze was judged as that occurring slightly further away from the gate and is indicated as generally faint, streaky, and asymmetric. This type of haze is caused by excessively cold polymer melt temperatures, indicating that the minimum processing setpoint temperature in the extruder had not been achieved. The minimum processing setpoint temperature is determined by dropping the barrel temperature setpoint for each run until preforms are made which have unacceptable crystalline haze. The range of minimum processing setpoint temperature is bracketed by the minimum setpoint temperature which produced preforms that had acceptable haze and the closest lower setpoint temperature at which the haze of the preforms was unacceptable.

The particles of Example 1 were injection molded in this manner. Preforms made at 275° C. had acceptable haze, at 265° C. were acceptable, at 260° C. were unacceptable, and to tighten the range, another run at 262° C. was found acceptable. Therefore, for this material, the minimum processing setpoint was found to be between 260° C. and 262° C.

EXAMPLE 6

The polyester polymer of Example 3 was injection molded to determine the minimum processing set point at which it could be molded before unacceptable crystalline haze appeared in the preforms using the same protocol and haze standard as in Example 5, except that the screw speed was 58 rpm, the backpressure was 125 psi, the transfer time was 2.62 seconds, the recovery time was 1.5 seconds, for a total cycle time of 18.2 seconds.

Preforms made at 265° C. had acceptable haze, at 260° C. were acceptable, at 255° C. were unacceptable, and to tighten the range, another run at 257° C. was found acceptable. Therefore, for this material, the minimum processing set point was found to be between 255° C. and 257° C. The lower melting point and/or the lower degree of crystallinity for this material allowed the material to be injection molded at a lower minimum temperature. With properly adjusted molding conditions, shorter cycle times and lower AA generation are possible with this polymer.

COMPARATIVE EXAMPLE 7

The same material as in Example 4 was injection molded to determine the minimum processing set point at which it could be molded before unacceptable crystalline haze appeared in the preforms using the same protocol and haze standard as in Example 5, except that screw speed was 59 rpm, the backpressure was 129 psi, the transfer time was 4.4 seconds, the recovery time was 0.84 seconds, for a total cycle time of 18.1 seconds. The fill speed was increased to prevent short shots.

Preforms made at 265° C. had unacceptable haze, at 270° C. were marginal, with severe gate crystallinity, and at 275° C. was found acceptable. Therefore for this material, the minimum processing setpoint was found to be between 265° C. and 270° C. However, the melt temperature needed to be raised to 275° C. to reduce the gate crystallinity to an acceptable level. The higher melting point and/or the higher degree of crystallinity for this material required the material to be injection molded at a higher minimum temperature.

EXAMPLE 8

This set of experiments illustrates polyester polymer particles having a level of residual acetaldehyde of less than 10 ppm, having an It.V. of at least 0.72 dl/g, and either at least two melting peaks, wherein one of said at least two melting peaks is a low peak melting point having a peak temperature within a range of 140° C. to 220° C. and having a melting endotherm area of at least the absolute value of 1 J/g; or a melting point when measured on the DSC first heating scan, wherein the trace departs from a baseline in the endothermic direction at a temperature of less than or equal to 200° C.

Figure 1:
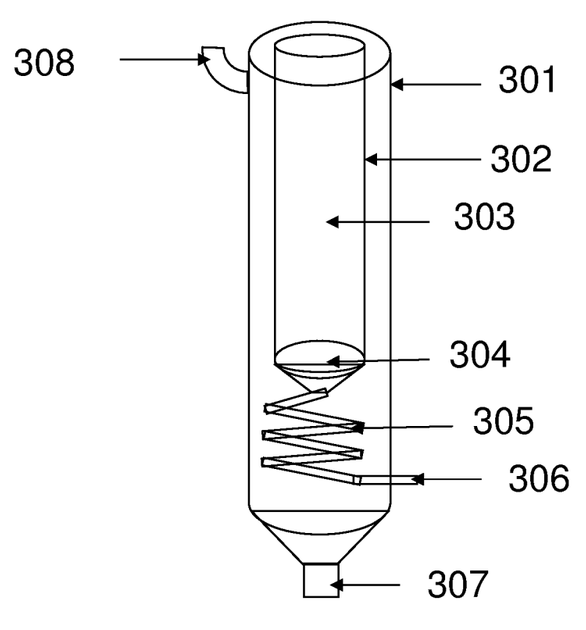
FIG. 1 illustrates a lab model of a modified chromatograph column used to conduct experiments.

Three different polyethylene terephthalate based polymers representing three different geometries of pellet shapes and sizes were placed in a fluidized bed reactor and exposed to either 150° C., 160° C., or 185° C. temperatures and a low air flow rate for at least 24 hours. More specifically, the experiments were conducted in a column reactor comprised of a modified chromatography column to allow for the introduction of a gas stream over the polymer particles and to regulate the temperature of the polymer particles, a round bottom flask, and a condenser.

The column reactor is illustrated in FIG. 1. The outside glass wall 301 contains an inside glass wall 302 within which is a chamber 303 for polymer particles. At the bottom of the chamber 303 is a fritted glass support 304, through which is fed a gas at a gas inlet port 306 flowing through a coil of glass tubing 305. On the outside glass wall is provided a connector 307 for a round bottom flask and a connector 308 for a condenser.

The temperature of the column reactor, polymer particles within the column and the gas flowing over the polymer particles in the column is regulated by refluxing a suitable solvent in a round bottom flask connected to the column at inlet 307. The column is insulated to minimize heat loss. A condenser is attached to the column at 308 to allow for the refluxing solvent to be returned to the reactor. Cumene (b.p.=150° C.), cyclohexanol (b.p.=160° C.) or diethyl octoate (b.p.=185° C.) was used as the temperature regulating solvent.

The experiments were conducted by charging the chamber 303 with 1.5 pounds (680 g) of a partially crystallized PET resin. Samples of about 60 grams were collected at various subsequent times. After subjecting the particles to the AA stripping operation, the particles were submitted for analysis to determine the level of residual acetaldehyde using the test method as described previously, the inherent viscosity using the test measurements as described previously, the % crystallinity and the low and high peak melting temperature and the area of the low melting endotherm using the DSC test method described previously.

For the 150° C. and the 185° C. conditions, three different runs were made. In the first run, a polyester polymer modified with 3 mol % of isophthalic acid and about 3.6 mol % of diethylene glycol and having an It.V. of 0.816 was charged ("Polymer 1"). The composition of Polymer 1 sets the maximum degree of crystallinity $T_{cmax}$ at 43.4%. Polymer 1 was thermally crystallized to a degree of crystallinity of 37.4% in a continuous process by passing it through two horizontal jacketed elongated vessels which were agitated by a longitudinal shaft with radially-mounted paddles, with the heating medium circulated through the jacket set at 180° C., which yielded a temperature for the pellets exiting the vessel of about 165° C., and with a residence time of the polymer in the vessels of about 30 minutes. The average particle dimensions of Polymer 1 were about 1.84×2.68×2.43 mm. In the second run, a polyester polymer modified with 2 mol % of isophthalic acid and about 2.7 mol % of diethylene glycol and having an It.V. of 0.802 was charged ("Polymer 2"). The composition of Polymer 2 sets the maximum degree of crystallinity $T_{cmax}$ at 45.3%. Polymer 2 was crystallized with a roll processing unit to a degree of crystallinity of 42.0%. The roll processing unit was operated at a rate of about 325 lb/hr with a calendar roll temperature setpoint of 155° C. and a polymer sheet temperature before the calendar roll entrance of about 147° C. The average particle dimensions of Polymer 2 were about 2.45× 3.09×3.90 mm. In the third run, a polyester polymer modified with 2 mol % of isophthalic acid and about 2.7 mol % of diethylene glycol and having an It.V. of 0.820 was charged ("Polymer 3"). The composition of Polymer 3 sets the maximum degree of crystallinity $T_{cmax}$ at 45.3%. Polymer 3 was crystallized underwater to a degree of crystallinity of 35.9% with a water temperature of about 160° C. for a residence time of about 5 minutes. The average particle dimension of Polymer 3 was about 2.75 mm diameter. For the 160° C. condition, only Polymer 1 was used.

The air flow for each experiment was set at 0.0067 SCFM using ambient plant air. The amount of solvent charged to the round bottom flask connected to the column reactor was 1000 ml. The polymer charge was 1.5 lbs in each case. The polymer was added to the column reactor after the column had reached the target temperature of 150° C., 160° C., or 185° C., depending upon the solvent used in each set of experiments. The time at which the polymer was added to the vessel was set as the start time for the experiment (Time=0 hr). The temperature of the polymer particles was measured by a thermocouple placed on the fritted glass support (304 in FIG. 1)

The results of the experiments are reported in Table 1.

Comparative Examples 1 and 4 require at least about 4.9 to 10.4 J/g, respectively more energy to melt than any of the samples tested in this example.

What we claim is:

1. A process for melt process for melt processing polyester polymer particles comprising:
    A) if a drying zone is present, drying the particles in the drying zone to produce dried particles;
    B) feeding the particles into a melt processing zone, or if a drying zone is present, feeding dried particles into a melt processing zone;
    C) melting the particles in the melting processing zone, and
    D) forming articles from the melt;
    wherein the polymer particles introduced into the melt processing zone or into the drying one if present contain at least 90 mole % ethylene glycol residues based on hydroxyl residues in the polymers, and the particles comprise at least 75% virgin polyester, and
        (i) have at least two melting peaks wherein one of said at least two melting peaks is a low peak melting point within a range of 140° C. to 220° C. and having a melting endotherm area of at least the absolute value of 1 J/g or
        (ii) have one or more melting peaks at least one of which, when measured on a DSC first heating scan, has a heating curve departing from a baseline in the endothermic direction at a temperature of less than or equal to 200° C.,
    wherein the melt processing zone comprises a barrel, a heating element directing heat to the barrel, a screw rotating within the barrel, and a screw motor; and the screw revolutions are at a setting which is higher than the screw revolutions than would be applied to melt process, at the same power, a polyester polymer having the same intrinsic viscosity (It.V), same composition, a low peak melting point, or a sole peak melting point where two peaks do not exist, greater than 220° C., to form the same article having substantially the same level of haze.

2. The process of claim 1, wherein the article is a sheet or a film or a pipe.

3. A process for melt processing polyester polymer particles comprising:
    A) feeding a plurality of polyester polymer particles into a melt processing zone;
    B) melting the particles in the melt processing zone to form a polyester polymer melt, wherein the melt processing zone comprises a barrel, a die or orifice, and a heating element directing heat to the barrel; and

TABLE 1

| Polymer Number | Processing Temp | Initial Residual AA (ppm) | Time At Processing (hrs) | Final Residual AA (ppm) | Final It.V. (dL/g) | Final $T_{m1a}$ (° C.) | Final $T_{m1b}$ (° C.) | Final $T_{m1a}$ endotherm area (J/g) | Final wt % Crystallinity |
|---|---|---|---|---|---|---|---|---|---|
| 1 | 150° C. | 45.23 | 23.75 | 2.45 | 0.829 | 188 | 243 | 10.1 | 39.7 |
| 1 | 160° C. | 57.02 | 23.75 | 3.00 | 0.810 | 185 | 243 | 6.0 | 35.4 |
| 1 | 185° C. | 43.36 | 7.5 | 5.13 | 0.826 | 206 | 243 | 6.6 | 43.4 |
| 2 | 150° C. | 7.52 | 24.5 | 1.04 | 0.804 | 178 | 252 | 3.4 | 43.8 |
| 2 | 185° C. | 20.67 | 2.83 | 2.56 | 0.812 | 200 | 250 | 1.6 | 42.0 |
| 3 | 150° C. | 19.83 | 21.67 | 0.84 | 0.792 | 178 | 249 | 7.0 | 36.9 |
| 3 | 185° C. | 18.01 | 10.0 | 1.05 | 0.844 | 217 | 247 | 10.1 | 40.3 |

The results indicated that for all temperatures tested, 150° C., 160° C., and 185° C., the level of residual acetaldehyde remaining after about 24 hours was about 3 ppm or less, with each sample having a double melting peak with the low peak melting temperature $T_{m1a}$ at or below 220° C.

C) forming at least one article from the polyester polymer melt, wherein the polymer particles introduced into the melt processing zone have an intrinsic viscosity (It.V.) of at least 0.72 dl/g and exhibit at least two melting peaks on a DSC first heating scan, wherein one of said at least two melting peaks is a low peak melting point having a peak temperature within a range of from about 140° C. to about 220° C., wherein the low peak melting point has a melting endotherm area of at least the absolute value of 1 J/g, wherein the maximum temperature setting of at least one heating element directing the one or more zones on the barrel during said melting of step B) is lower than would be required to melt process the same polyester polymer particles having a low peak melting point (or a sole peak melting point where two peaks do not exist) higher than 220° C. to form the same article having substantially the same level of haze and applying all of the same settings in the melt processing zone other than the maximum temperature setting.

4. The process of claim 3, wherein the polymer particles introduced into the melt processing zone have an intrinsic viscosity of at least 0.78 dL/g.

5. The process of claim 3, wherein the polymer particles introduced into the melt processing zone have not been solid state polymerized.

6. The process of claim 3, wherein said polymer particles introduced into the melt processing zone have a residual acetaldehyde content of 10 ppm or less.

7. The process of claim 3, wherein said polyester particles comprise at least 75 percent virgin polyester.

8. The process of claim 3, wherein the polymer particles introduced into the melt processing zone have a degree of crystallinity in the range of from about 25% to about 45%.

9. The process of claim 3, wherein the peak temperature of the low peak melting point is in the range of from about 160° C. to about 210° C.

10. The process of claim 3, wherein the particles are formed of a polyester polymer comprising—
(a) a carboxylic acid component comprising at least 90 mole % of the residues of terephthalic acid and/or derivates of terephthalic acid; and
(b) a hydroxyl component comprising at least 92 mole % of the residues of ethylene glycol, based on 100 mole percent of carboxylic acid component residues and 100 mole percent of hydroxyl component residues in the polyester polymer.

11. The process of claim 10, wherein said hydroxyl component comprises residues of 2,4-dihydroxy-1,1,3,3-tetramethyl-cyclobutane.

12. The process of claim 10, wherein at least 89% of the polymer is virgin polymer.

13. The process of claim 7, wherein the article is selected from group consisting of a preform, a sheet, a film, a pipe, a bottle, and a container.

* * * * *